United States Patent Office 2,803,552
Patented Aug. 20, 1957

2,803,552

ANTIFOG MATERIALS AND METHOD OF PRODUCING THE SAME

Donald F. Stedman, Ottawa, Ontario, Canada, assignor to National Research Council, Ottawa, Ontario, Canada, a body corporate of Canada No Drawing. Application July 1, 1953, Serial No. 365,523

Claims priority, application Canada June 23, 1953

2 Claims. (Cl. 106—13)

This invention relates to antifog materials and to the production of stabilized polyethoxy alcohol material for use on window surfaces for the prevention of the accumulation thereon of fog.

Polymers of alcohol and ethylene oxide are known to have antifog properties but as prepared by heretofore known methods they are not satisfactory, because of solubility in water and the tendency of the sodium catalyst to absorb carbon dioxide from the air with the formation of carbonate, which mars the antifog properties of the material. Removal of the sodium catalyst to prevent carbon dioxide absorption reduces the antifog properties.

In accordance with the invention an alcohol containing from 12 carbon atoms (lauryl) to 30 carbon atoms (myricyl) is polymerized to absorb at least three and not more than seven ethylene oxide groups per molecule of alcohol. With less than three ethylene groups per molecule of alcohol the product is not sufficiently active and with more than seven it is too soluble in water. The product is not a precise species, with reference to the number of ethylene oxide molecules, but rather a mixture of polymers containing on the average ethylene oxide molecules within the range stated.

The polymerization is effected by heating the alcohol to 150° to 200° C. in the presence of 0.001 to 1%, preferably .05% of sodium metal and passing ethylene oxide into the mixture until the desired number of ethylene oxide groups have been absorbed, in a well known manner. The polyethoxy alcohol is then stabilized by heating to about 60° C. and passing oxygen through it for about seven days and to insure complete stability it is allowed to stand in contact with air at 60° C. for a similar period. In this treatment with air it is best that the polymer be treated in a layer not more than about 5 centimeters thick so as to insure uniform oxidation. The oxygen treatment may be carried out at room temperature but a longer period of about two months is required. On the other hand if the oxygen treatment is carried out at 100° C. only about twelve hours is required. By this process the enhanced antifog activity provided by the catalyst is retained in the product and the difficulties usually resulting from its presence are avoided.

The following example is illustrative of the commercial application of the method.

The relatively inexpensive cetyl alcohol is treated at 175° C. in the presence of .05% sodium metal with ethylene oxide until about 5 ethylene oxide groups are substituted in the alcohol molecule. The polyethoxy alcohol product is stabilized at 60° C. by passing through it oxygen at atmospheric pressure for a period of seven days and while maintaining the temperature at 60° C. exposure to air for a period of seven days.

By this treatment strong alkalinity due to sodium is neutralized and the product, when applied to window surfaces is not readily removed by water, and when used for antifog purposes remains effective for four or five times as long as do the known polyethoxy products. Without the oxidation treatment the polyethoxy alcohols are readily dissolved and removed by condensed water and are therefore effective for only a very short period of time.

The product is preferably used in admixture with carbon black, especially acetylene black. Barium sulphate, magnesia, calcium fluoride and rouge in finely divided form may be used instead of carbon black as a friction agent but they are not as satisfactory for antifog purposes. 0.01 to 10% of carbon black may be incorporated with the polymer, but 0.02 to 0.2% is the most useful range. The product is a paste and is used in that form. 2 to 10% of the product may be impregnated into a fabric for application to the glass or plastic surface. The surface is moistened and the product applied with rubbing until the surface is uniformly coated and polished.

I claim:

1. An antifog material consisting essentially of a monohydric polyethoxy alcohol containing between 12 and 30 carbon atoms and at least 3 and not more than 7 ethylene oxide groups synthesized in the presence of a sodium catalyst retained therein, and stabilized by substantially removing alkalinity by oxidation with oxygen.

2. An antifog material as defined in claim 1 in admixture with a finely divided friction agent being one of a group consisting of carbon black, barium sulphate, magnesia, calcium fluoride and rouge.

References Cited in the file of this patent

UNITED STATES PATENTS

| | | |
|---|---|---|
| 2,133,480 | Schoeller | Oct. 18, 1938 |
| 2,306,175 | Mars | Dec. 22, 1942 |
| 2,372,171 | Bennett | Mar. 27, 1945 |
| 2,393,863 | Meyers | Jan. 29, 1946 |
| 2,454,886 | Sapiro | Nov. 13, 1948 |
| 2,561,010 | Carson | July 17, 1951 |
| 2,612,458 | Stedman | Sept. 30, 1952 |